United States Patent [19]

Geddes et al.

[11] Patent Number: 4,997,875
[45] Date of Patent: Mar. 5, 1991

[54] HIGH-MELT-FLOW FIBER-REINFORCED PROPYLENE POLYMER COMPOSITIONS

[75] Inventors: Kathleen A. Geddes, Belle Mead, N.J.; Ralph A. Guyer, Bear, Del.; Richard C. Miller, West Chester, Pa.

[73] Assignee: Himont Incorporated, Wilmington, Del.

[21] Appl. No.: 331,410

[22] Filed: Mar. 31, 1989

Related U.S. Application Data

[63] Continuation-in-part of Ser. No. 206,256, Jun. 13, 1988, abandoned.

[51] Int. Cl.$^5$ .......................... C08K 3/40; C08K 3/34; C08K 3/02; C08L 23/10
[52] U.S. Cl. ..................... 524/504; 524/439; 524/445; 524/584; 524/531; 525/64; 525/66; 525/74; 525/78
[58] Field of Search ................... 525/74; 524/584, 504

[56] References Cited

U.S. PATENT DOCUMENTS

| | | | |
|---|---|---|---|
| 3,264,253 | 8/1966 | McCulloch et al. | 524/584 |
| 4,000,111 | 12/1976 | Henman et al. | 260/42.15 |
| 4,003,674 | 1/1977 | Ide et al. | 524/584 |
| 4,336,226 | 7/1982 | Inoue et al. | 525/78 |
| 4,417,019 | 11/1983 | Yamanoto et al. | 524/549 |
| 4,433,073 | 2/1964 | Sano et al. | 523/201 |

FOREIGN PATENT DOCUMENTS 60-124645  7/1985  Japan ................................. 524/584

OTHER PUBLICATIONS

Modern Plastics—Apr. 1986—"Technology Revolution Reshapes PP Performance"—pp. 14, 16 & 21.

*Primary Examiner*—Carman J. Seccuro

[57] ABSTRACT

Disclosed is a composition comprising about from 20 to 65 percent by weight of a fiber reinforcing-agent, preferably glass fiber, dispersed in as-polymerized propylene polymer material, e.g., propylene homopolymer, having a melt flow rate (MFR) of about from 55 to 430 dg/min. The composition is useful in the manufacture of large and complex fiber-reinforced articles and parts by injection molding.

19 Claims, No Drawings

HIGH-MELT-FLOW FIBER-REINFORCED PROPYLENE POLYMER COMPOSITIONS

CROSS-REFERENCE TO RELATED APPLICATION

This application is a continuation-in-part of application Ser. No. 206,256, filed June 13, 1988, now abandoned.

FIELD OF THE INVENTION

This invention relates to propylene polymer compositions, and more particularly, to propylene-derived polymers which are fiber-reinforced.

BACKGROUND OF THE INVENTION

The synthetic resin formed by the polymerization of propylene as the sole monomer is called polypropylene. While "polypropylene" has been used from time to time in the art to include a copolymer of propylene and a minor amount of another monomer, such as ethylene, the term is not so used herein.

The polypropylene of commerce is a normally solid, predominantly isotactic, semi-crystalline, thermoplastic polymer mixture formed by the polymerization of propylene by Ziegler-Natta catalysis. In such catalysis the catalyst is formed from an organic compound of a metal of Groups I–III of the Periodic Table, such as an aluminum alkyl, and a compound of a transition metal of Groups IV–VIII of the Periodic Table, such as a titanium halide. Typically the crystallinity of polypropylene thus produced is about 60% as measured by X-ray diffraction. As used herein, "semi-crystalline" means a crystallinity of at least about 5–10% as measured by X-ray diffraction. Also, the typical weight average molecular weight (Mw) of the normally solid polypropylene of commerce is 100,000–4,000,000, while the typical number average molecular weight (Mn) thereof is 25,000–600,000. The typical molecular weight distribution or polydispersity is about from 4 to 7. The typical melt flow rate (MFR) of most of the normally solid polypropylenes of commerce as-polymerized has ranged from less than 1 to about 20 dg/min as determined by ASTM D 1238. Most commonly, the melt flow rate is about 4 dg/min. Over about the last five years, polypropylenes having a melt flow rate, as-polymerized, of about 20 dg/min have become available. In the last half of 1986, a normally solid polypropylene was made commercially available having an as-polymerized MFR of from about 55 to about 430 dg/min, and weight average and number average molecular weight such that its polydispersity is about 4–5.

Fiber-reinforced polypropylene has been made by incorporating short fibers in as-polymerized, polypropylene having a MFR of up to 20 dg/min. Typically the amount of fiber has been 20–30% by weight of the total composition. A few have been made with 40% fiber content. As the amount of fiber reinforcement in this polypropylene is increased, the degree of warpage increases since the addition of the fiber leads to a decrease in the MFR, thereby making it necessary to increase the temperature and pressure used during the preparation of the fiber-reinforced product. This increased stress in the preparation process leads to the warpage problems. Hence, it is not surprising that heretofore fiber-reinforced polypropylenes with a 40% fiber content have been particularly difficult to mold.

Fiber mat-reinforced polypropylenes wherein the polypropylene is an as-polymerized typical MFR polypropylene and wherein a glass fiber mat is used as the fiber-reinforcing agent also are known. Such products are typically prepared by compression molding the glass mat with the polypropylene. However, these fiber-reinforced products cannot be used in injection molding processes since the glass mat does not flow.

Since the molecular weight distribution of the polypropylene of commerce having a MFR of up to 20 dg/min cannot be readily controlled in the reactor, and since the as-polymerized polypropylene produced cannot be spun into a fiber successfully in all fiber manufacturing processes, methods of visbreaking the polymer were developed to narrow the molecular weight distribution of the as-polymerized polypropylene and to increase its MFR. The most common method used today is to treat these as-polymerized polypropylenes of commerce with a free radical initiator, such as a peroxide, thereby initiating a free radical reaction. The narrower molecular weight distribution and higher MFR are a result of chain scissioning during the free radical reaction. The more chain scissioning which occurs under the particular reaction conditions, the narrower the molecular weight distribution and the higher the MFR of the resultant polypropylene. Polypropylenes having, as a result of visbreaking, a narrow molecular weight distribution, i.e., a polydispersity typically of about 2 to 3, and a high MFR, i.e., up to about 1000 dg/min, are known.

Unfortunately, the visbreaking process adversely affects the physical properties of the as-polymerized polypropylene starting material. This adverse effect increases as the extent of visbreaking is increased. Thus, the higher the MFR of a visbroken polypropylene, the more diminished are its physical properties so that it is generally weaker and less stiff than the as-polymerized polypropylene from which it has been prepared.

Visbroken polypropylene having a MFR of 50 dg/min or more is not practical for use in the preparation of fiber-reinforced polypropylene since it is tedious and difficult to take the polymer through the visbreaking operation as well as subsequent stranding and pelletizing operations which are required before the visbroken material can be compounded with fibers.

SUMMARY OF THE INVENTION

This invention provides a composition comprising an as-polymerized propylene polymer material, eg., propylene homopolymer, having a melt flow rate (MFR) of from about 55 to about 430, preferably from about 60 to about 400, dg/min, and, dispersed therein, about from 20 to 65%, preferably about from 30 to about 50%, by weight of a fiber reinforcing-agent such as glass fiber, based on the total weight of said polymer material and reinforcing agent. The composition is useful in the manufacture of large or complex injection-molded articles.

The composition of the invention has better flow characteristics than fiber-reinforced compositions made with low MFR as-polymerized polymer while, at the same time, not being deleteriously affected in terms of its strength and stiffness as would be expected from the behavior of unreinforced polypropylene as the melt flow rate increases.

DETAILED DESCRIPTION

The propylene polymer material useful in the composition of this invention is a normally solid, predominantly isotactic, semi-crystalline, thermoplastic polymer having a MFR of from about 55 to about 430 dg/min in the as-polymerized condition, i.e., as it comes out of the reactor, and a polydispersity typically in the range of about from 4 to 5. Hence, the molecular weight distribution is broader than that of conventional visbroken polypropylene.

As used herein, "propylene polymer material" means propylene polymer material selected from the group consisting of (a) homopolymers of propylene and (b) copolymers of propylene and ethylene, e.g., random copolymers in which the maximum polymerized ethylene content is about 5, preferably about 4, percent by weight.

Suitable fiber reinforcing-agents for the present composition include fiber made of glass, metal, ceramic, graphite, and organic polymers such as polyesters and nylons, e.g., aramids, in filamentary form, all of which are commercially available. The preferred fiber reinforcing-agent is glass fiber. Commercially available glass fiber reinforcing-agents as marketed are generally sized with sizing agents. Silane compounds and azidosilanes are typical sizing agents.

The fiber reinforcing-agent can be in the form of short fibers, typically about from 1.6 mm. (1/16 in) to 7.9 mm. (5/16 in) in length; long fibers, typically about from 12.7 to 51 mm (½ to 1 in) in length; or in the form of continuous filament fibers. Preferably the fiber is in the short fiber form.

The preferred composition of the invention contains a coupling agent which improves the adhesion of the reinforcing fibers to the polymer matrix. However, compositions containing essentially no coupling agent, while less versatile in applicability, are useful in those applications in which strength requirements are less stringent. Typical coupling agents for use in the preferred composition are olefin polymers which have been chemically modified with an ethylenically unsaturated carboxylic acid or a derivative thereof, such as thus-modified polyethylene, polypropylene, and copolymers of ethylene and propylene with each other or with other alpha olefins. Typically the content of the carboxylic acid or its derivative is about from 2% to 4%, preferably about from 2.5% to 3.5%, based on the modified polymer. Suitable unsaturated carboxylic acids and derivatives thereof include acrylic acid, maleic acid, itaconic acid, maleic anhydride, citraconic anhydride and itaconic anhydride. Methods of preparing such coupling agents are known in the art; see, for example, U.S. Pat. No. 3,416,990 at col. 2, lines 48 to 63, and U.S. Pat. No. 3,483,276 at col. 1, lines 34–62, the disclosures of which are incorporated herein by reference. Certain thus-modified olefin polymers are commercially available.

The coupling agent, when present, is present in an amount ranging about from 1 to 10, preferably about from 1 to 2, parts per hundred parts propylene polymer material. Most preferably about 1 part per hundred parts polypropylene is used. The preferred coupling agent is a maleic anhydride-modified crystalline polypropylene having a maleic anhydride content of about from 2% to 4%.

The composition of this invention may also contain one or more mineral fillers, such as talc, calcium carbonate and mica. When mineral fillers are present, they are typically present in an amount totalling about from 1 to 40 percent by weight of the total composition. Metallic flakes, glass flakes, milled glass, and glass spheres also are among the fillers which can be present.

Conventional additives, such as stabilizers and pigments, also may be present. Antioxidant-type stabilizers can be present in an amount of about from 0.05 to 1.0 pph (parts per hundred), based on the weight of propylene polymer material. Antacids, if used, are typically present in an amount of about from 0.05 to 0.5 pph, preferably about from 0.05 to 0.2 pph, based on propylene polymer material weight. Heat stabilizers can be used in an amount of about from 0.05 to 1 pph, based on propylene polymer material weight. Pigments can be used in an amount of about from 0.2 to 5, preferably about from 2 to 3, pph, based on propylene polymer material weight.

Typical antioxidants include hindered phenolic compounds, such as tetrakis[methylene(3,5-ditertiarybutyl4-hydroxyhydrocinnamate)] methane. Suitable antacids include alkali and alkaline earth metal stearates, such as sodium stearate and calcium stearate. Thioesters, such as trilauryl trithiophosphate (TLTTP) and distearyl thiodipropionate (DSTDP) are typical heat stabilizers. Suitable pigments include carbon black and titanium dioxide.

The composition of this invention is prepared by dry tumble blending as-polymerized propylene polymer material and the reinforcing fibers, or by mixing the ingredients in a mixing apparatus, such as a twin screw extruder, at a temperature sufficient to melt the propylene polymer material, i.e., about from 165° to 280° C., preferably about from 220° to 260° C., until a homogeneous mixture is obtained. The twin screw extruder is preferred since it can have multiple entry ports, commonly referred to as feed ports, for the addition of the ingredients to be extrusion mixed, with at least one feed port generally being about halfway downstream of the first feed port. Hence, all of the ingredients except the fiber reinforcing-agent can be added and extrusion mixed at a temperature sufficient to melt the propylene polymer material and for a time sufficient for a homogeneous blend of these ingredients to be obtained by the time the fiber reinforcing-agent is added at the feed port about halfway downstream of the first feed port. This provides for minimum fiber breakage during the extrusion mixing and for ease of wetting of the fiber reinforcing-agent by the molten polypropylene thereby enhancing the dispersion of the fiber uniformly throughout the polypropylene matrix.

Examples illustrative of the composition of this invention and the physical properties thereof are set forth below.

EXAMPLES 1–6

Reinforcing fibers were mixed with as-polymerized polypropylene having the nominal MFR's set forth in Table I. Control experiments were carried out in the same manner as the examples, except with polypropylene having the low MFR set forth in Table I. The physical properties of these compositions are set forth below in Table I. The compositions in all of the examples and control experiments were prepared in a twin screw extruder having two feed ports (the second feed port being located about halfway downstream from the first feed port) by charging all of the ingredients, except for the glass fiber, into the first feed port and then charging the glass fiber into the second feed port. The temperature during extrusion mixing ranged from 220° C. to 260° C. In each example and control experiment set forth in Table I, the following ingredients also were incorporated into the fiber-reinforced composition (in parts per hundred parts polypropylene by weight): 0.10 part tetrakis[methylene-(3,5-di-tert-butyl4-hydroxyhydrocinnamate)]methane, 0.25 part distearyl thiodipropionate, 0.20 part sodium stearate, and 1.0 part maleic anhydride-modified polypropylene having a maleic anhydride content of 2.7–3.6%, based on the weight of the modified polymer.

ing was accomplished by extruding a blend of molten Pro-fax 6301 polypropylene of MFR 12 dg/min and Lupersol 101 2,5-dimethyl-2,5-bis(tert-butylperoxy hexane), a liquid. To make a 60-MFR polymer, a 6.35-cm extruder was used, and the melt temperature at the die was 207° C. Lupersol was used in the amount of 0.04 gram per kg of polypropylene. To make a 400-MFR polymer, a 5.08-cm extruder was used, and a melt temperature of 218° C. The amount of Lupersol used was

TABLE I

|  | Ex. 1 | Ex. 2 | Ex. 3 | Ex. 4 | Ex. 5 | Ex. 6 | Control Expt. 1 | Control Expt. 2 | Control Expt. 3 | Control Expt. 4 |
|---|---|---|---|---|---|---|---|---|---|---|
| Ingredients | | | | | | | | | | |
| Polypropylene[1,2] MFR 12 dg/min | | | | | | | 90.0 | 80.0 | 70.0 | 60.0 |
| Polypropylene[1,3] MFR 60 dg/min | 80.0 | 60.0 | 50.0 | | | | | | | |
| Polypropylene[1,4] MFR 400 dg/min | | | | 80.0 | 60.0 | 50.0 | | | | |
| Glass Fiber[1,5] | 20.0 | 40.0 | 50.0 | 20.0 | 40.0 | 50.0 | 10.0 | 20.0 | 30.0 | 40.0 |
| Properties | | | | | | | | | | |
| MFR dg/min ASTM D 1238 | 25.7 | 15.2 | 11.1 | 106 | 57 | 54 | 4.5 | 3.4 | 2.3 | 2.0 |
| Tensile strength MPa, ASTM D 638 (23° C.)** | 84.7 | 113.4 | 119.0 | 83.3 | 114.1 | 119.7 | 63.7 | 84.7 | 102.2 | 112.7 |
| Flex Modulus, 1% secant, MPa ASTM D 790B (23°)** | 3944 | 7447 | 9608 | 4273 | 7924 | 9493 | 2600 | 3786 | 5298 | 6801 |
| HDT at 1.85 MPa, °C. ASTM D 648* | 152 | 156 | 156 | 157 | 157 | 158 | 134 | 149 | 153 | 152 |
| Notched Izod Impact, at 23° C., J/m ASTM D 256A*** | 85 | 117 | 112 | 114 | 85 | 123 | 64 | 107 | 128 | 128 |

1. Parts by weight.
2. Pro-fax 6301 available from HIMONT U.S.A., Inc.
3. PF-443 available from HIMONT U.S.A., Inc.
4. PF-441 available from HIMONT U.S.A., Inc.
5. OCF 457AA 4.8 mm glass fibers available from Owens-Corning Fiberglas Corp.
*Heat deflection temperature.
**To convert MPa to psi, divide by 0.007.
***To convert J/m to ft-lbf/in., divide by 53.38

EXAMPLES 7–19

The procedure of Examples 1–6 was used, and the control experiments were carried out in the same manner as the examples except that visbroken, instead of as-polymerized, polypropylene was used. The visbreaking 0.17 gram per kg of polypropylene.

The polypropylenes in these examples were of the same designation as those used in Examples 1–6 except from different lots. The compositions of Examples 8, 10, 14, and 16 did not contain maleic anhydride-modified polypropylene. The results are shown in Table II.

TABLE II

| Example No. | Control Expt. No. | Polypropylene MFR 60[a] Parts by Wt. | Polypropylene MFR 400[a] Parts by Wt. | Glass Fiber Parts by Wt. | MFR[a] | Tensile[b] Strength 23° C. | Tensile[b] Strength 80° C. | Flexural[c] Strength 23° C. | Flexural[c] Strength 80° C. | Flexural[d] Modulus 23° C. | Flexural[d] Modulus 80° C. | HDT[e] °C. | Notched Izod Impact Strength[f] 23° C. |
|---|---|---|---|---|---|---|---|---|---|---|---|---|---|
| 7 | | 80 | | 20 | 13.8 | 80.5 | 50.5 | 121.8 | 77.7 | 4130 | 2870 | 149 | 79 |
|  | 5 | 80 | | 20 | 13.7 | 77.7 | 48.0 | 116.9 | 75.6 | 4060 | 2730 | 147 | 73.7 |
| 8** | | 80 | | 20 | 12.3 | 65.1 | | 97.3 | | 4060 | 2870 | 144 | 71.5 |
| 9 | | 60 | | 40 | 6.5 | 102.2 | 60.1 | 162.4 | 94.5 | 7770 | 5250 | 152 | 95.6 |
|  | 6 | 60 | | 40 | 6.3 | 98.0 | 59.4 | 158.2 | 95.2 | 7840 | 5040 | 151 | 77.4 |
| 10** | | 60 | | 40 | 4.8 | 70.7 | | 113.4 | 72.8 | 7840 | 5110 | 148 | 60.9 |
| 11 | | 50 | | 50 | 7.3 | 103.6 | 61.6 | 168.7 | 99.4 | 10220 | 6370 | 153 | 81.7 |
|  | 7 | 50 | | 50 | 9.5 | 97.3 | 59.4 | 160.3 | 93.1 | 9730 | 6300 | 150 | 71.0 |
| 12 | | 40 | | 60 | 5.1 | 95.9 | 58.5 | 157.5 | 92.4 | 11900 | 6860 | 153 | 67.8 |
|  | 8 | 40 | | 60 | 8.1 | 90.3 | 56.1 | 153.3 | 92.4 | 12040 | 7140 | 150 | 67.8 |
| 13 | | | 80 | 20 | 72.4 | 74.2 | 54.3 | 121.1 | 90.3 | 4830 | 3570 | 154 | 94.5 |
|  | 9 | | 80 | 20 | 50.3 | 70.7 | 47.8 | 113.4 | 67.9 | 3990 | 2660 | 147 | 74.2 |
| 14** | | | 80 | 20 | 64.1 | 61.6 | | 96.6 | 67.9 | 4480 | 3080 | 154 | 77.4 |
| 15 | | | 60 | 40 | 64.9 | 100.8 | 71.6 | 169.4 | 111.3 | 8540 | 6160 | 156 | 91.3 |
|  | 10 | | 60 | 40 | 22.8 | 97.3 | 57.2 | 153.3 | 84 | 7630 | 4760 | 152 | 96.1 |
| 16** | | | 60 | 40 | 9.8 | 71.4 | | 116.2 | 73.5 | 8330 | 5670 | 152 | 60.3 |
| 17 | | | 50 | 50 | 9.7 | 106.4 | 72.9 | 175.7 | 115.5 | 11130 | 7910 | 153 | 82.7 |
|  | 11 | | 50 | 50 | 15.0 | 100.8 | 58.5 | 154 | 89.6 | 9660 | 5880 | 153 | 80.1 |
| 18 | | | 40 | 60 | 7.3 | 93.8 | 66.8 | 161.7 | 109.2 | 13020 | 8680 | 154 | 73.1 |
|  | 12 | | 40 | 60 | 12.1 | 86.8 | 51.9 | 151.2 | 86.1 | 11830 | 6720 | 153 | 63.5 |

TABLE II-continued

| Example No. | Control* Expt. No. | Polypropylene MFR 60[a] Parts by Wt. | Polypropylene MFR 400[a] Parts by Wt. | Glass Fiber Parts by Wt. | MFR[a] | Tensile[b] Strength | | Flexural[c] Strength | | Flexural[d] Modulus | | HDT[e] °C. | Notched Izod Impact Strength[f] 23° C. |
|---|---|---|---|---|---|---|---|---|---|---|---|---|---|
| | | | | | | 23° C. | 80° C. | 23° C. | 80° C. | 23° C. | 80° C. | | |
| 19 | | | 35 | 65 | 9.2 | 70 | 46.5 | 124.6 | 86.1 | | 7980 | 154 | 53.9 |

[a]Nominal - dg/min - ASTM D 1238
[b]MPa - ASTM D 638
[c]MPa - ASTM D 790
[d]1% secant, MPa - ASTM D 790
[e]Heat Deflection Temperature at 1.85 MPa - ASTM D 648
[f]J/m - ASTM D 256A
*Visbroken polypropylene
**Coupling agent omitted The above data show that the compositions of this invention have the high melt flow rate required in the manufacture of large or complex articles by injection molding, and have improved properties over the fiber-filled visbroken polypropylene comparative compositions. The data show that compositions of the invention have higher tensile and flexural strengths, a higher flexural modulus, and a higher heat deflection temperature than compositions made with visbroken polypropylene of comparable melt flow rate and having the same glass fiber content.

EXAMPLES 20–25

Six compositions of the invention, and two control compositions, were processed into injection-molded articles by following the procedure specified in ASTM D 4101–82, paragraph 9. Table III gives the fill-point temperature determined for each composition as specified in the standard, and the stock temperature for molding. The fill-point temperature is the minimum stock temperature that will give complete cavity fill when operating on a 45-second cycle under the conditions detailed in the standard with the injection pressure set at 80% of the maximum capacity of the machine used. The stock temperature (the ASTM temperature recommended for the molding procedure) is 60±5° C. higher than the fill-point temperature.

TABLE III

| Ex. No. | Control Expt. No. | Polypropylene MFR (dg/min) | Polypropylene Parts by Wt. | Glass Fiber Parts by Wt. | Fill Point Temp. (°C.) | Stock Temp. (°C.) |
|---|---|---|---|---|---|---|
| 20 | | 60 | 90 | 10 | 168 | 228 ± 5 |
| 21 | | 60 | 80 | 20 | 168 | 228 ± 5 |
| 22 | | 60 | 70 | 30 | 171 | 231 ± 5 |
| 23 | | 400 | 70 | 30 | 164 | 224 ± 5 |
| | 13 | 12 | 70 | 30 | 187 | 247 ± 5 |
| | 14 | 4 | 70 | 30 | 184 | 244 ± 5 |
| 24 | | 60 | 60 | 40 | 174 | 234 ± 5 |
| 25 | | 60 | 50 | 50 | 177 | 237 ± 5 |

As can be seen from the above data, the temperature required to fill a mold with a high-melt-flow fiber-reinforced polypropylene composition of the invention in an injection molding machine is lower than the temperature required to fill the mold with a conventional polypropylene containing the same amount of fiber reinforcement. Moreover, the benefit of being able to carry out the injection molding operation at a lower temperature with the present compositions is obtained even when the fiber content of the composition is increased.

EXAMPLES 26–29

If the same melt temperature required to injection mold conventional fiber-reinforced products of low melt flow rate is used to injection mold the compositions of the invention, in a given period of time a larger mold can be filled with the present compositions. This is shown by a serpentine flow test. In this test, performed according to HIMONT Procedure No. 166 (available on request from HIMONT Incorporated), the composition is molded, and its length (average flow distance) measured, in a serpentine S-shaped cavity mold plate using an injection molding machine.

The results of the tests are shown in the following table. The MFR of the as-polymerized polypropylene used to prepare the composition in each example was 60 dg/min.

TABLE IV

| Ex. No. | Polypropylene Parts by Wt. | Glass Fiber Parts by Wt. | Av. Flow Distance (cm) |
|---|---|---|---|
| 26 | 80 | 20 | 32.36 |
| 27 | 70 | 30 | 28.04 |
| 28 | 60 | 40 | 25.63 |
| 29 | 50 | 50 | 22.15 |

In contrast to the above, conventional low MFR (12 dg/min) as-polymerized polypropylene compositions containing 30% glass fiber flowed an average of only 19.41 cm in this test.

The compositions of this invention can be molded with less of the warpage problems generally associated with the conventional fiber-reinforced polypropylenes of the prior art. Moreover, the surfaces of molded articles prepared with the compositions of this invention are relatively smooth or satiny. In contrast, the surfaces of molded articles prepared with conventional fiber-reinforced polypropylene products provide a rough matte finish.

The composition of this invention is useful in injection molding applications where fiber-reinforced polymer materials typically are used, that is, in the manufacture of large and of complex injection-molded articles and parts, such as, for example, automotive instrument panels.

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

I claim:
1. A composition comprising as-polymerized propylene polymer material having a melt flow rate of about from 55 to 430 dg/min and a coupling agent in the amount of about from 1 to 10 parts per hundred parts of said propylene polymer material, and, dispersed therein, about from 1 to 10 parts per hundred parts of said propylene polymer material, and, dispersed therein, about from 20% to 65% of a fiber reinforcing-agent, based on the total weight of said propylene polymer material and said reinforcing agent wherein said coupling agent is an olefin polymer which has been chemically modified with an ethylencially unsaturated carboxylic acid or a derivative thereof.

2. A composition of claim 1 wherein said propylene polymer material has a polydispersity of about 4-5.

3. A composition of claim 1 wherein the content of reinforcing agent is about from 30% to 50%.

4. A composition of, claim 1 wherein the melt flow rate of said propylene polymer material is in the range of about from 60 to 400 dg/min.

5. A composition of claim 1 wherein said coupling agent is a propylene polymer material which has been modified by chemcial reaction with an ethylenically unsaturated polycarboxylic acid or a derivative of such acid.

6. A composition of claim 5 wherein said coupling agent is a maleic anhydride-modified propylenen polymer material having a maleic anhydride content of about from 2% to 4% based on the weight of the modified polypropylene.

7. A composition of claim 1 wherein said reinforcing agent is selected from the group consisting of glass, metal, ceramic, graphite, and polymeric fibers.

8. A composition of claim 8 wherein said reinforcing agent is in the form of glass fibers.

9. An injection molded article comprising the composition of claim 1.

10. An injection molded article comprising the composition of claim 5.

11. An injection molded article comprising the composition of claim 6.

12. The composition of claim 1 wherein the propylene polymer material is polypropylene.

13. The composition of claim 3 wherein the propylene polymer material is polypropylene.

14. The composition of claim 8 wherein the propylene polymer material is polypropylene.

15. The composition of claim 5 wherein the propylene polymer material is polypropylene.

16. The composition of claim 6 wherein the propylene polymer material is polypropylene.

17. An injection molded article comprising the composition of claim 14.

18. An injection molded article comprising the composition of claim 15.

19. An injection molded article comprising the composition of claim 16.

* * * * *

UNITED STATES PATENT AND TRADEMARK OFFICE
CERTIFICATE OF CORRECTION

PATENT NO.  :  4,997,875
DATED       :  March 5, 1991
INVENTOR(S) :  Kathleen A. Geddes et al.

It is certified that error appears in the above-identified patent and that said Letters Patent is hereby corrected as shown below:

At col. 4, line 18, change "butyl4-hydroxyhydrocinnamate)]" to --butyl-4-hydroxyhydrocinnamate)]--.

At col. 5, line 4, change "tetrakis[methylene-(3,5-di-tert-butyl4-hydroxy-" to -- tetrakis[methylene-(3,5-di-tert-butyl-4-hydroxy- --.

At col. 8, line 67, after "comprising" insert --an--.

At col. 9, lines 4-5, delete "from 1 to 10 parts per hundred parts of said propylene polymer material, and, dispersed therein, about".

At col. 9, line 10, change "ethylencially" to --ethylenically--.

At col. 9, line 16, delete the comma.

At col. 9, line 25, change "propylenen" to --propylene--.

At col. 9, line 28, change "polypropylene" to --propylene polymer material--.

Signed and Sealed this

Fourth Day of August, 1992

Attest:

DOUGLAS B. COMER

Attesting Officer    Acting Commissioner of Patents and Trademarks